T. CARROLL.
CASH REGISTER.
APPLICATION FILED JUNE 12, 1916.
1,302,509.
Patented May 6, 1919.
9 SHEETS—SHEET 7.
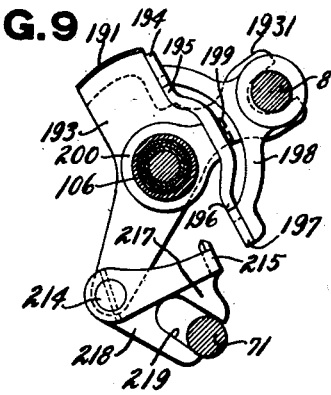
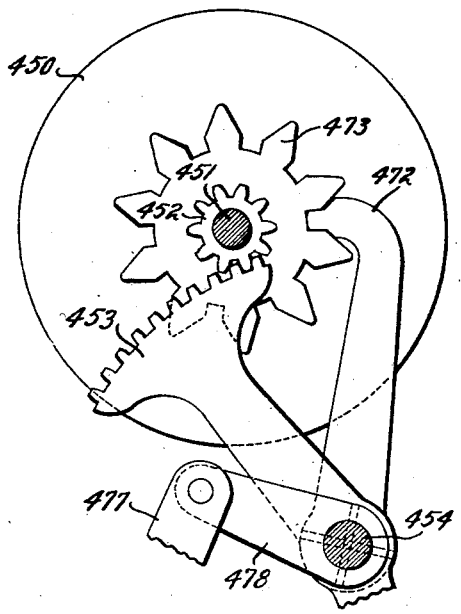
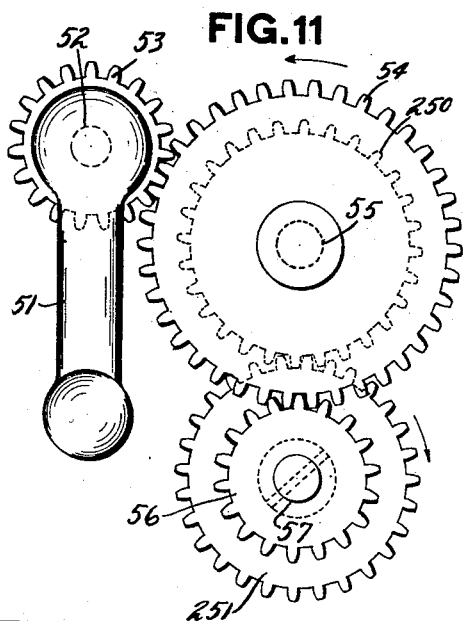
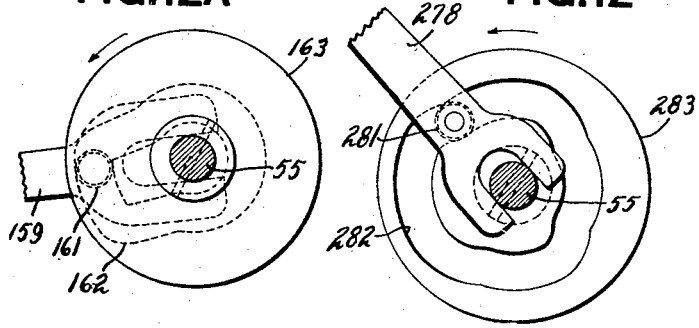
Inventor
THOMAS CARROLL
Attorneys T. CARROLL.
CASH REGISTER.
APPLICATION FILED JUNE 12, 1916.
1,302,509.
Patented May 6, 1919.
9 SHEETS—SHEET 8.
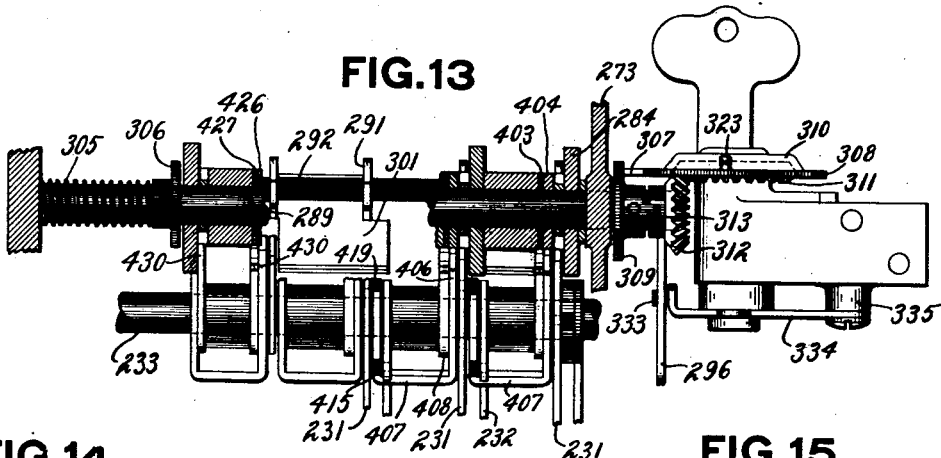
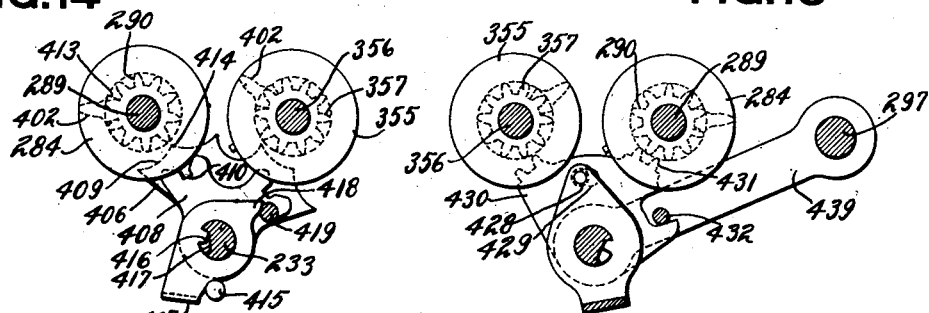
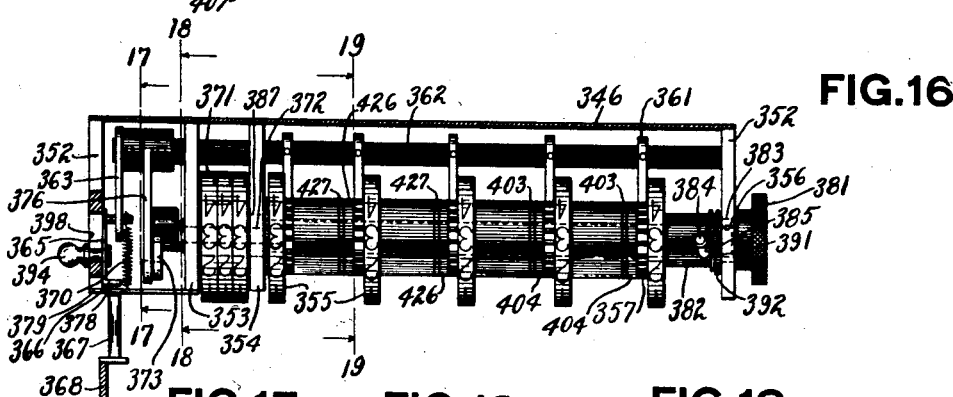
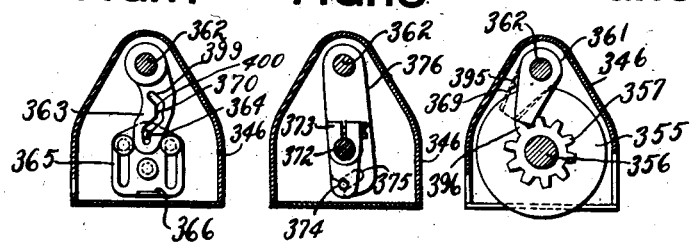
Inventor
THOMAS CARROLL
Pearl Beust
Attorneys T. CARROLL.
CASH REGISTER.
APPLICATION FILED JUNE 12, 1916.
1,302,509.
Patented May 6, 1919.
9 SHEETS—SHEET 9.
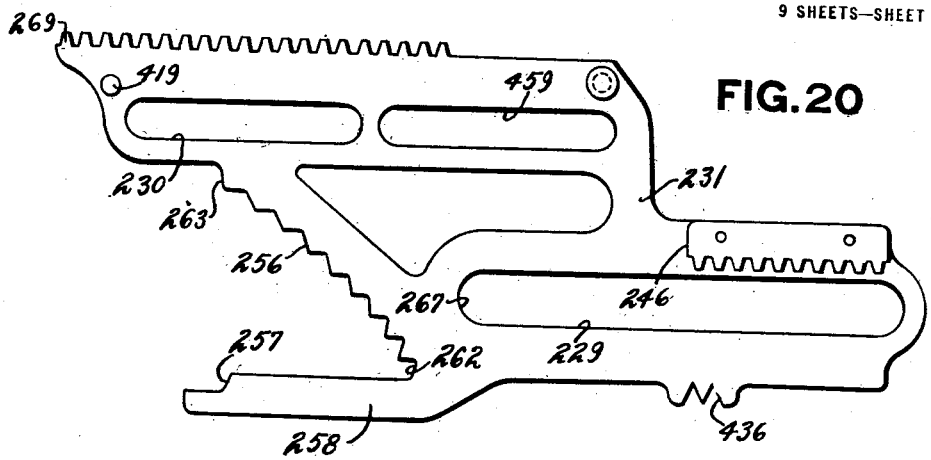
FIG. 20
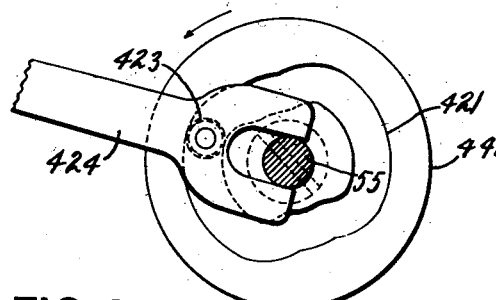
FIG. 21
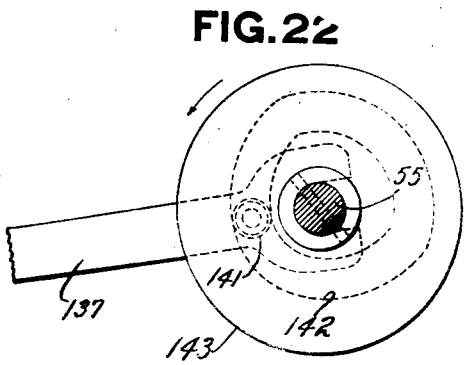
FIG. 22
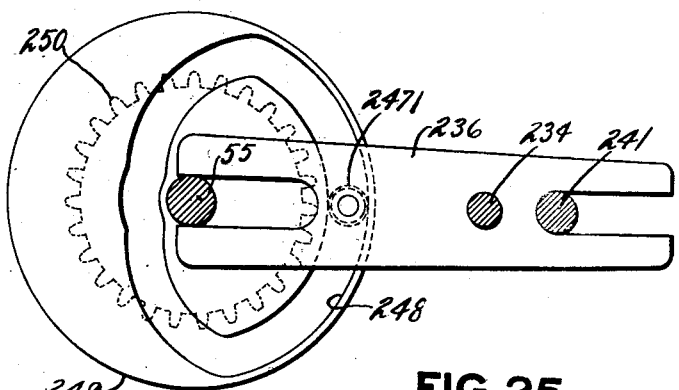
FIG. 23
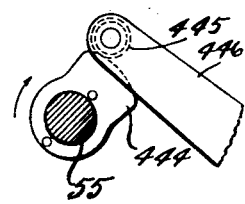
FIG. 24
FIG. 25
Inventor
THOMAS CARROLL
Attorneys

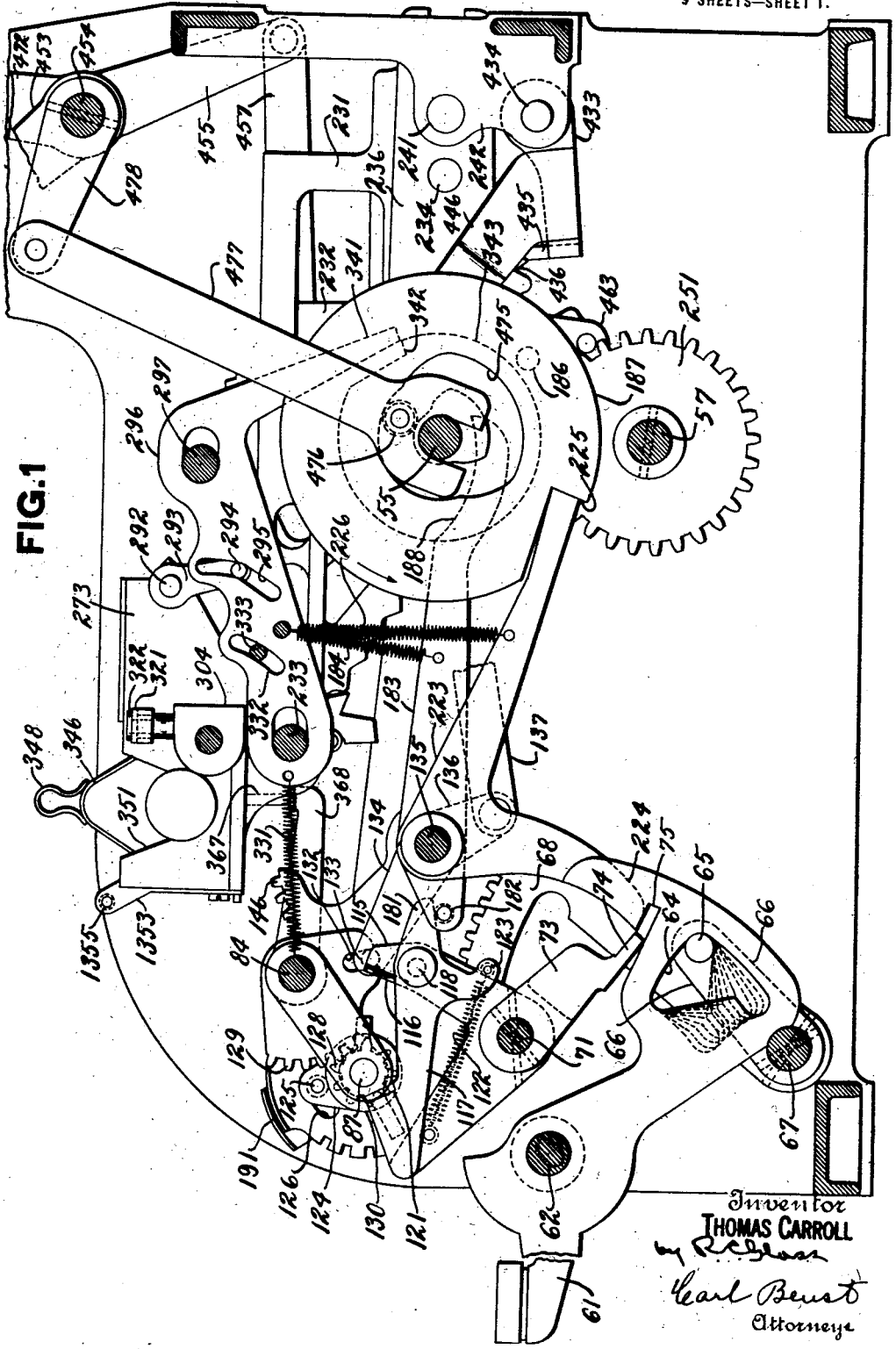

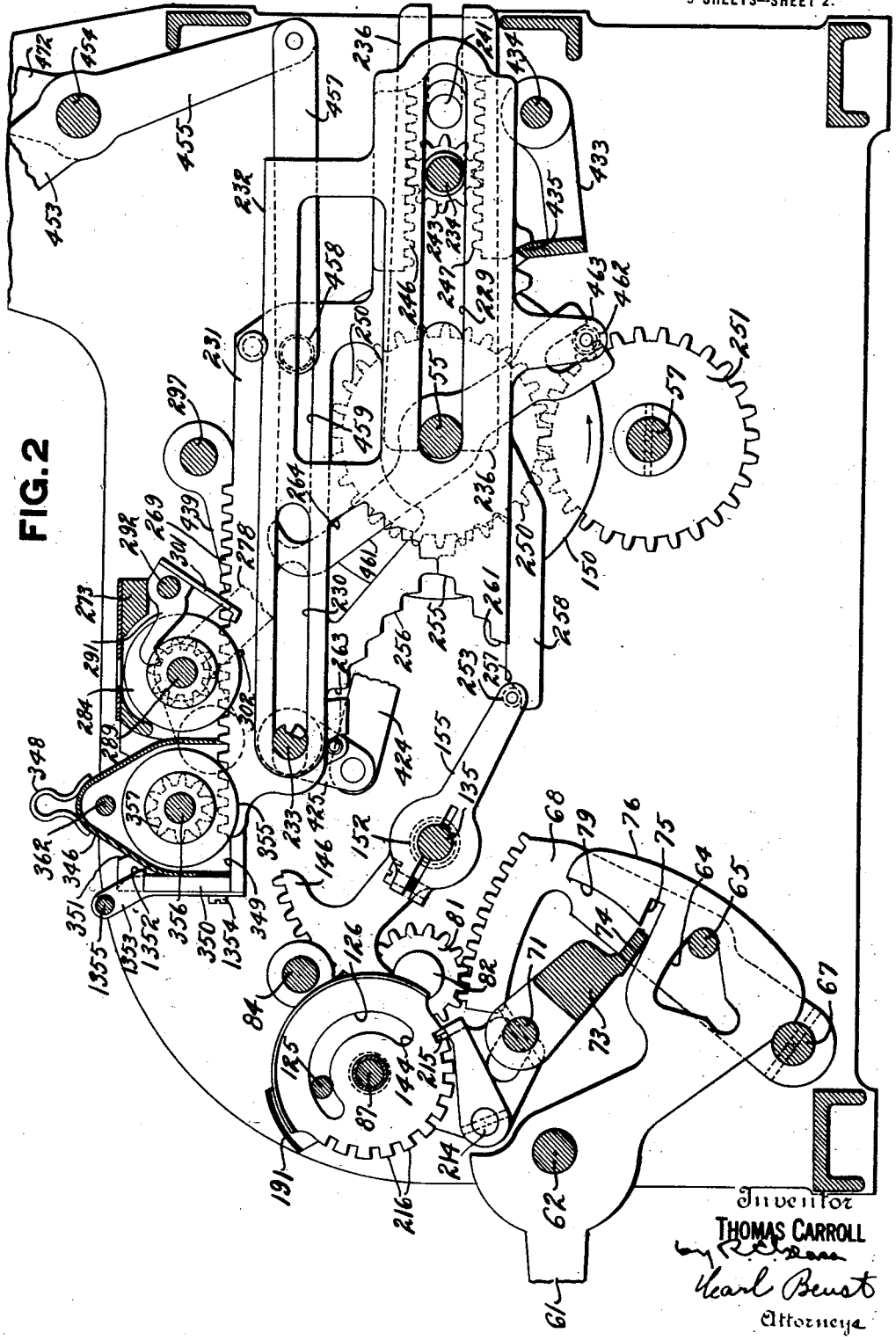

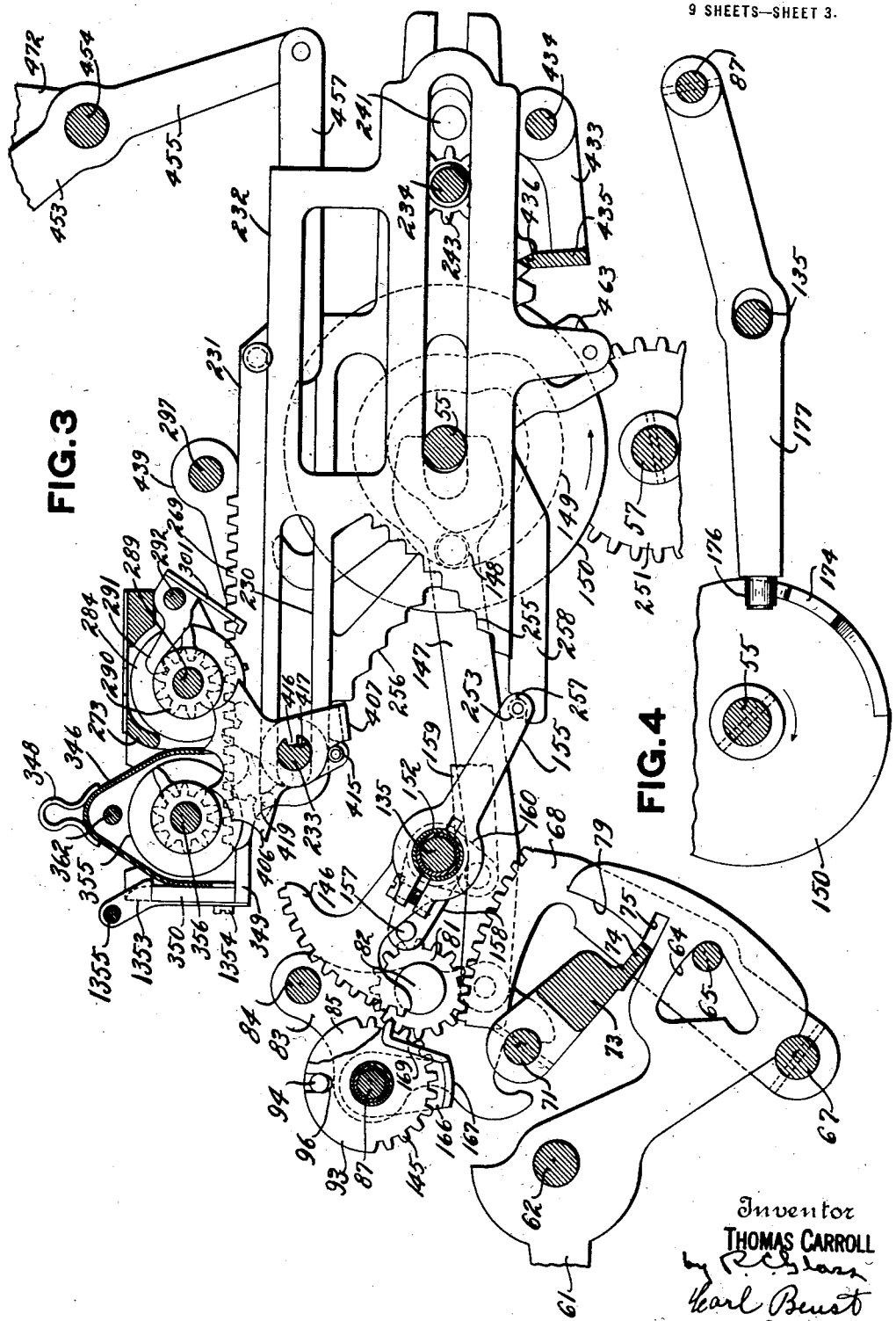

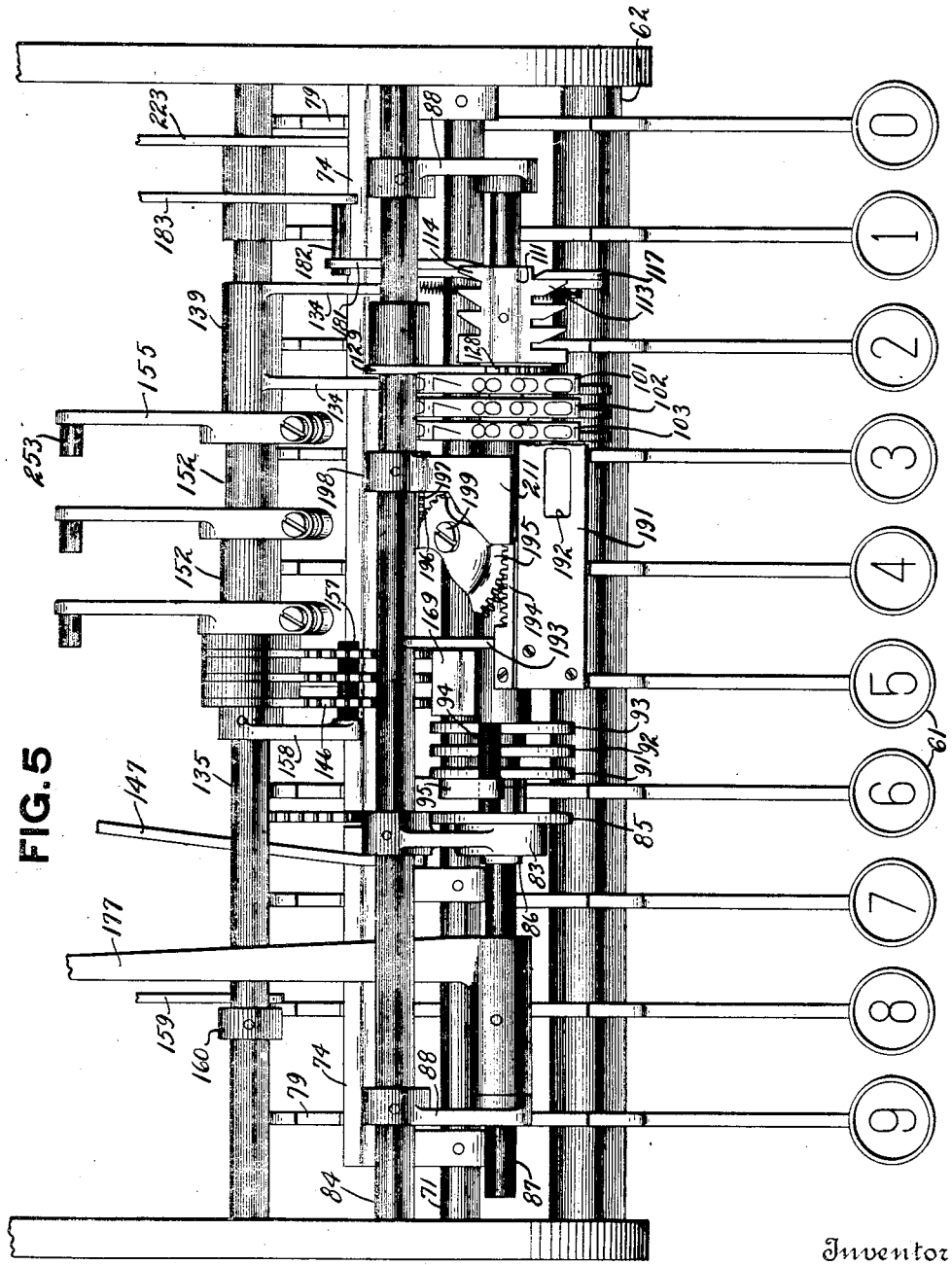

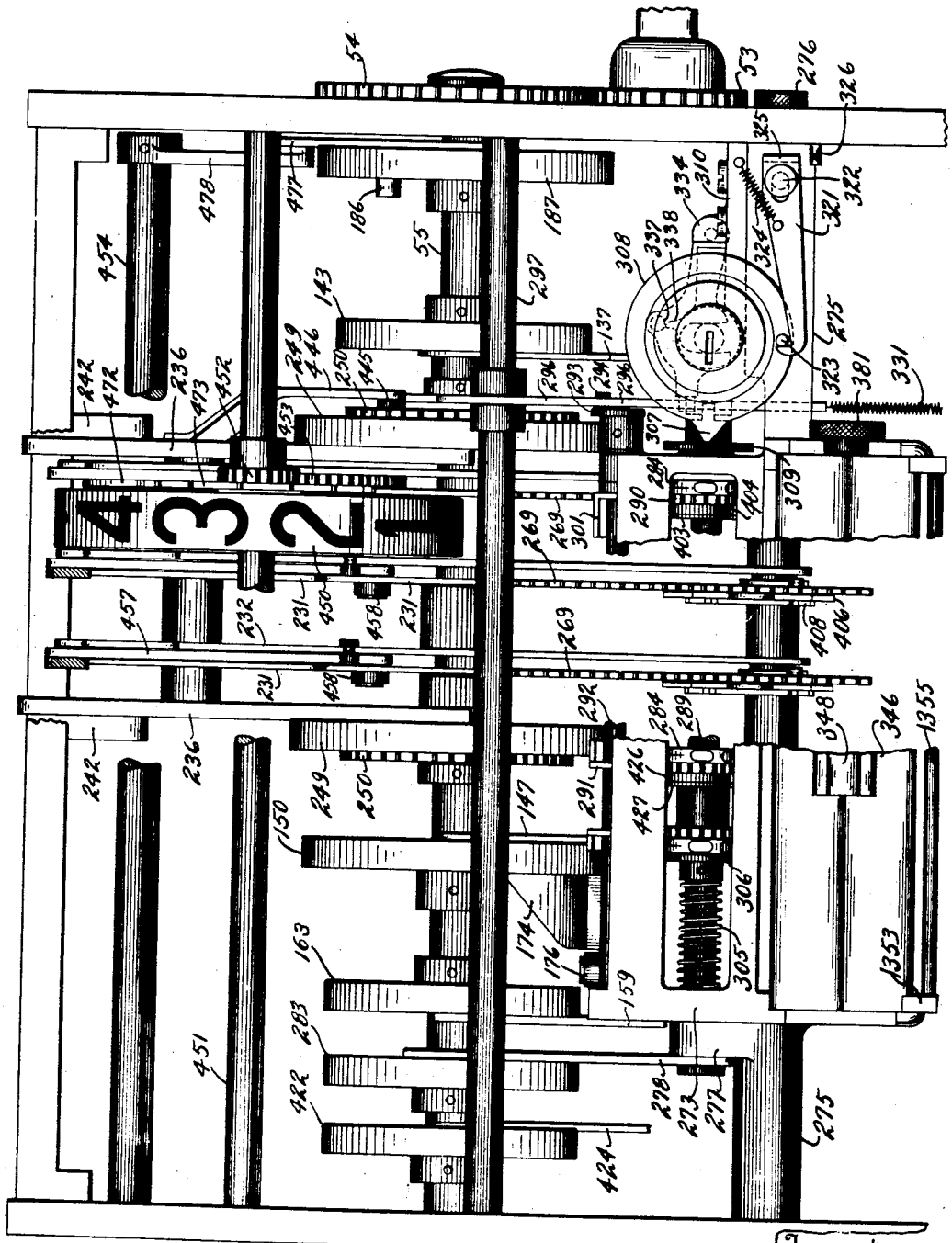

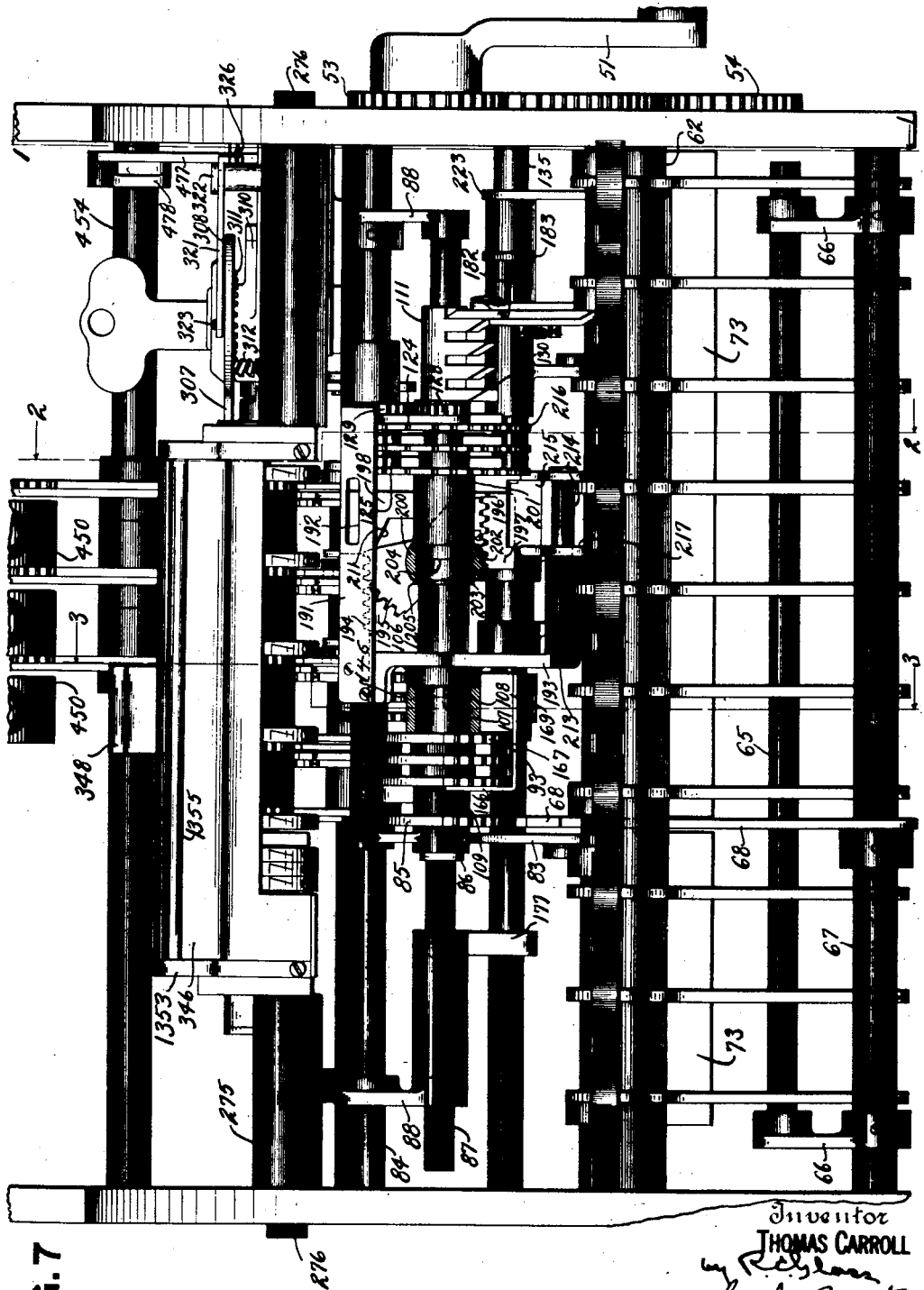

UNITED STATES PATENT OFFICE.

THOMAS CARROLL, OF DAYTON, OHIO, ASSIGNOR TO THE NATIONAL CASH REGISTER COMPANY, OF DAYTON, OHIO.

CASH-REGISTER.

1,302,509.   Specification of Letters Patent.   Patented May 6, 1919.

Application filed June 12, 1916. Serial No. 103,169.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates generally to accounting machines and has particular reference to improvements in what is known in the art as the ten key type of machines.

One of the objects of the invention is to provide a machine of the kind mentioned which is suitable for use for registering and indicating the transactions occurring in stores and similar places of business.

Another object of the invention is to provide a construction whereby a ten key machine may be employed to enter items both in a grand total retaining device and in detachable total retaining devices. This not only results in a machine having the advantages of the ten key type of mechanism in the way of compactness and simplicity of construction, but also makes it possible to classify entries according to an unlimited number of classes by inserting different detachable total retaining devices as a preliminary to entering the various items.

Another object of the invention is to provide an improved differential mechanism for ten key machines.

Another object of the invention is to provide indicator setting mechanism operated by pairs of complementarily movable members to turn the indicators directly and in either direction from one position to another during movement of the members in the same direction.

In setting up an item the keys are operated in the order in which the amount is usually read, that is, the highest digit first and the units last, and as each key is operated a small "finder" or indicator is set to bring a digit corresponding to the key to indicating position. These small indicators or finders, which are usually referred to herein as the index indicators to distinguish them from the other indicators mentioned above, are normally concealed by a screen, but as each indicator is adjusted the screen is moved to expose the digit on the indicator to view. One of the objects of this invention is to provide an improved mechanism for operating such a screen.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 1 is a section taken on the line 1—1 (Fig. 7) looking in the direction of the arrows, but having the grand totalizer turn to zero lock omitted.

Fig. 2 is a section taken on the line 2—2 (Fig. 7) looking in the direction of the arrows.

Fig. 3 is a section taken on the line 3—3 (Fig. 7) looking in the direction of the arrows, with some of the frames and other parts omitted for the sake of clearness.

Fig. 4 is a detail of the cam and lever for shifting some of the item mechanism laterally to normal position.

Fig. 5 is a top plan view of the keyboard and the item mechanism.

Fig. 6 is a top plan view of the differential mechanism for operating the totalizer and setting the indicators, some of the parts being broken away and the mechanism of Fig. 5 being omitted for the sake of clearness.

Fig. 7 is a front elevation of the assembled machine.

Fig. 8 is a detailed rear view of the index indicators and some of the other setting mechanism, in connection with mechanism for operating the index indicator screen and alining devices.

Fig. 9 is a right hand view of some of the devices shown in Fig. 8.

Fig. 10 is a detail of mechanism for setting and alining the indicators in position.

Fig. 11 is a detail of the operating handle and gearing for transmitting power to the driving shafts.

Fig. 12 is a detail of the totalizer engaging cam.

Fig. 12ᴀ is a detail of the cam for restoring the differential stop adjusting segments to zero.

Fig. 13 is to show the construction of the transfer mechanism common to both the grand totalizer and detachable totalizer and the mechanism for turning the grand total totalizer to zero.

Fig. 14 is a detail section looking to the right in Fig. 13 to show the construction of the transfer mechanism associated with the lower order to totalizer elements.

Fig. 15 is a detail section looking to the left in Fig. 13 to show the construction of the transfer mechanism for higher order totalizer elements.

Fig. 16 shows one of the detachable totalizers with the casing partly broken away to expose the interior mechanism to view.

Fig. 17 is a section on the line 17—17 of Fig. 16 looking in the direction of the arrows.

Fig. 18 is a section taken on the line 18—18 Fig. 16 looking in the direction of the arrows.

Fig. 19 is a section taken on the line 19—19 Fig. 16 looking in the direction of the arrows.

Fig. 20 is a detail of one of the complementarily and differentially movable members.

Fig. 21 is a detail of the cam for restoring tripped transfer devices to normal position.

Fig. 22 is a detail of the cam operating the index indicator turn to zero mechanism.

Fig. 23 is a detail of one of the cams for actuating the differentially and complementarily movable members.

Fig. 24 is a detail of the cam for alining the differentially and complementarily movable members and locking them in position between operations.

Fig. 25 is a rear view of the pinions and racks for operating the differentially and complimentarily movable members.

The machine in the drawings is constructed to add amounts of three denominational orders although its capacity may readily be increased without departing from the invention. It has a keyboard containing a key for each of the ten digits, these keys, as previously stated, being operated in the order in which the amount is usually read: that is, the key for the highest order digit is operated first and the key for the units digit last. Common to the ten digit keys is an operating segment which is moved directly from one position to another by successive operations of the keys and all movements of the segment are transmitted to an item setting element. This item setting element carries a pin engaging three item wheels so that the first movement of the setting element will turn all three of the setting wheels to a position corresponding to the digit key operated. The item wheels are then shifted laterally far enough to disengage the highest order item wheel from the pin on the item setting element. When the second key is operated the two item wheels remaining in engagement with the pin are turned directly to the new position and the second item wheel is then disengaged from the pin. This adjusting and shifting movement is repeated at the operation of the third digit key so that when three keys have been operated the three wheels will have been set to represent the three different digits of the amount. Rigid with the item wheels are index indicators bearing numerals to show the amounts which have been set up ready for entry in the machine.

The item wheels and their index indicators are then turned back to zero by an invariably moved element connected to a handle operated driving shaft. Before they are turned back, however, the item wheels are engaged with segments rigid with differentially adjustable controlling arms or stops and as the item wheels and index indicators are turned back to zero the segments and stops are adjusted to positions representing the item. Coöperating with the stops just mentioned are three pairs of differentially and complementarily movable members, one member of each pair carrying a total retaining device actuating rack. An invariably moved driving device carries the members forward until steps on their forward ends engage the differentially adjusted stops and then returns the members to zero. The arrangement of the steps is such that while the combined movements of each pair of members is always ten steps the movement of the member carrying the actuating rack is in direct proportion to the value of the key operated. For example, if the "1" key has been depressed the rack carrying member will be caused to move one step and its companion member nine steps during the subsequent operation of the machine while if the "9" key is operated the actuator carrying member will have nine steps of movement and its companion member one step of movement. Only nine of the ten steps of combined movement are controlled by the stops in adding operations, the tenth step being controlled by totalizer elements to effect transfers.

The grand total retaining device and the detachable total retaining devices are, in the present embodiment, all in the form of totalizers. The differentially and complementarily movable members are operated twice during each operation of the machine. During the first movement of the members the amount represented by the positions of the differentially adjustable stops is entered on the grand totalizer and during the second movement the same amount is entered on the detachable totalizer. There may be any number of these detachable totalizers which are insertible singly in the machine, although but one of them is shown in the drawings. The use to which they are put is, of course, immaterial, but a number of different purposes for which they might be employed will readily suggest themselves, such as for a plurality of clerks, departments, goods, etc.

The grand totalizer and the detachable totalizers both control the same transfer mechanism, this transfer mechanism being so constructed that as a totalizer element passes from 9 to 0 a stop will be set to arrest the movement of the companion member for the actuating member of next higher order one step short of normal or zero position, thereby causing the higher actuating member to move one step farther than it otherwise would to turn the higher order adding wheel an additional division.

Each amount entered on the totalizer is set up on indicators and displayed in the usual way. These indicators are of the short movement type, that is, they are moved directly from their last indicating positions to the positions indicating the new amount. The indicators are turned by operating segments actuated through links having slot and pin connections with the rack bearing differentially and complementarily movable members. Movement of the rack bearing members in one direction will rotate the indicators from lower to higher position. The indicators are turned in the opposite direction by pivoted levers operatively connected to the companion members in such a way that while the members are all moving in the same direction the upper ends of the levers will be moved in the opposite direction. During this opposite movement the upper ends of the levers will contact the pins on the links to turn the indicators from lower to higher positions the levers and the slots in the actuating members coöperating at the end of the forward movement of the member to positively limit the rotations of the indicators.

The index indicators previously mentioned are normally concealed from view by a screen, but when an item wheel and its indicator are shifted after adjustment, the screen is also shifted in the same direction so as to expose the indicator to view. This is repeated at each operation so that at any point in the setting up of the item only the indicators which have been adjusted will be visible. The screen is operated by movement of a carriage carrying the item wheels and index indicators, the construction being such that for each step of movement of the carriage the screen will be given two steps of movement.

*Driving mechanism.*

The machine in the drawings is constructed to be driven by means of an operating handle 51 (Figs. 7 and 11) journaled on a stub shaft 52 attached to the right hand machine frame. Rigid with the operating handle is a gear 53 meshing with a large gear 54 fastened to a shaft 55. The gear 54 meshes with a gear 56 having a diameter one-half that of the gear 54 and equal to that of the gear 53, the gear 56 being fastened to a shaft 57. The shafts 55 and 57 both extend all the way across the machine and the gearing mentioned is so proportioned that for each two turns of the operating handle the shaft 55 will make one rotation and the shaft 57 two rotations. The shaft 55 drives practically all of the mechanism except the complementarily movable members, these members being operated by the shaft 57 as hereinafter described.

*Keyboard and item mechanism.*

The machine has ten keys 61, one for each of the digits "0" to "9" inclusive. The order in which the keys are arranged is shown in Fig. 5. All of the keys are pivoted on a rod 62 (Figs. 1, 2, 3 and 7) and have openings 64 in their rear portions surrounding a rod 65 supported at its ends by arms 66 fastened to a rock shaft 67. The rod 65 passes through a segment 68 fastened to the rock shaft 67. The openings 64 in the keys are differentially shaped so that the segment 68 may be adjusted to different positions by operating different keys and the segment left at such positions when the operated keys return to normal position. The opening 64 in the "0" key is so shaped that while operation of said key will not move the segment away from normal position it will return the segment to said normal position if it has been left in a different position by operation of one of the higher value keys. The openings in the other keys are shaped to move the segments extents in inverse proportion to the values of the keys. For example the opening 64 in the "1" key is shaped to give the rod 65 and segment 68 nine steps of movement from normal position while the opening in the "9" key will give the segment a single step of movement from normal. The reason for this will appear later.

Fastened to a rock shaft 71 extending across the machine are two bars 73, the bars being made separate to clear the segment 68. These bars are heavy enough to return depressed keys to normal position when the finger is removed and are formed as at 74 to coöperate with slots 75 in upwardly extended portions 76 on the rear ends of the keys. When a key is operated the bars 73 and shaft 71 will be rocked as a unit. The portion 74 of the associated bar 73 enters the slot 75 in the depressed key as the key is being operated, and as the bars 73 are rocked the portion 74 will be carried in front of curved edges 79 on unoperated keys thereby preventing depression of a second key after one has been started.

The movement of the segment 68 by the keys is imparted to a pinion 81 engaging the teeth of the segment. The pinion 81 (Figs. 3 and 5) is rotatably mounted on a stud 82 fastened to a plate 83, secured to a rock shaft 84 and meshes with the teeth of a setting element 85 attached to a hub 86 (Figs. 7 and 8). This hub is loosely mounted on a shaft 87 and is also journaled in a bearing in the plate 83, the construction being such that the element 85 is limited to rotative movement while the shaft 87, for reasons appearing later, is movable endwise through the hub 86 and through arms 88 (Figs. 5 and 7) fast on the shaft 84.

From the foregoing it is clear that the setting element 85 will be rotated directly from one position to another by successive operations of keys of different value. These movements of the setting element are transmitted to three item wheels 91, 92 and 93 by a pin 94 attached to the setting element 85. The pin 94 passes through a hole in a block 95 attached to the item wheel 91 and engages notches 96 (Fig. 3) in the peripheries of the item wheels. If the parts are all in the zero positions shown and a key is then operated the setting element 85 and the three item wheels will have a unitary movement counter clockwise (Fig. 3) depending as to extent on the key depressed. Near the end of the down stroke of the key the three item wheels are shifted slightly to the right (Figs. 5 and 7) and during the return stroke of the key they are shifted a second extent, the two shifting movements being sufficient to disengage the item wheel 93 from the stud or pin 94. Operation of the second key will turn the setting element 85 directly to a position corresponding to the value of the second key and the three setting elements are again shifted bodily to disengage the element 92 from the stud 94. When the third key is operated the same shifting movement occurs but, for reasons appearing later, the block 95 will prevent the pin 94 from becoming entirely disconnected from the element 91.

In order to show the operator the amount which the machine is prepared to add, the machine has three index indicators 101, 102 and 103 (Figs. 5 and 7) for the item wheels 91, 92 and 93 respectively, these indicators and their corresponding item wheels being connected by sleeves 106 (Figs. 8 and 9) concentric to the shaft 87. Shoulders 107 (Fig. 7) formed on the hubs of the item wheels engage notches 108 in the left ends of the sleeves. This shoulder and notch construction is for convenience in assembling the various elements on the shaft 87. Movement of the item wheels, sleeves and indicators laterally on the shaft 87 is prevented by a collar 109 fastened to the shaft at the left of the item wheels and a plate 111 fastened to the shaft 87 at the right of the index indicators.

The plate 111 forms part of the mechanism for shifting the shaft 87 and the item devices thereon laterally from one position to another. For this purpose the plate is provided with two series of teeth 113 and 114 on its front and rear edges respectively. The relative arrangement of the teeth of the two series is best shown in Fig. 5. Coöperating with these teeth is a bell crank 115 (Fig. 1) fastened to the rock shaft 71 and having a beveled edge 116 formed on its rearwardly and upwardly extending arm to engage the teeth 114 of the plate 111 when the shaft 71 is rocked by depression of a key. The arrangement is such that when the edge 116 engages the teeth 114 the shaft 87 and the item wheels and index indicators thereon will be shifted a short distance toward the right (Fig. 5). This movement is not sufficient to entirely disengage the pin 94 from an item wheel, the disengagement being completed by a pawl 117 as the key is returned to normal by the bar 73. This pawl is journaled on a stud 118 attached to the side of the bell crank 115 and has a beveled edge 121 to engage the teeth 113 of the plate 111. The pawl 117 is normally held in the position shown by a spring 122 (Fig. 1) stretched between a pin on the forward end of the bell crank 115 and a pin 123 on a downwardly projecting arm of the pawl 117. The pin 123 is normally in engagement with the rear edge of the bell crank 115 and limits movement of the pawl in one direction. The first movement imparted to the shaft 87 and parts thereon by the edge 116 on the bell crank will bring the plate 111 to a position where the teeth 113 will be in position to be engaged by the bevel 121 on the pawl 117 as the parts are carried back to their original position by the return rocking movement of the shaft 71, the construction being such that at each operation the bevels 116 and 121 will successively engage their corresponding teeth thereby shifting the shaft 87 far enough each time a key is operated to disengage an item wheel from the pin 94.

After the item has been set up on the item wheels and the index indicators the operating handle 51 is turned to enter the item on the totalizer and indicators. One of the first things accomplished by turning the handle is to turn the index indicators and the connected item wheels back to zero. For this purpose there is provided an arm 124 (Figs. 1, 2 and 7) loose on the shaft 87 and carrying a pin 125 extending through slots 126 in the index indicators. The slots 126 (as shown in Fig. 2) are long enough to permit the setting movement of the index indicators without interference with the pin 125. Rigid with the arm 124 is a pinion 128 meshing with the teeth of a segment 129 loosely mounted on the rock shaft 84. A disk 130 loosely mounted on the shaft 87 between the pinion 128 and the plate 111 holds the segment 129 in alinement with the pinion so that during the endwise movement of the shaft 87 the segment 129 will be caused to move laterally on the shaft 84. Engaging a notch 132 in the segment 129 is a rod 133 supported at its ends by arms 134 formed on a sleeve 139 (Fig. 5) loose on a shaft 135. Rigid with said sleeve is an arm 136 pivotally connected to a pitman 137 (Figs. 1 and 22) slotted to engage the driving shaft 55 and carrying a roller 141 projecting into a cam groove 142 in the side of a disk 143 fastened to the shaft 55. It will be recalled that this shaft makes one complete rotation at each operation of the machine. The cam groove 142 is so shaped that shortly after the shaft begins to turn the pitman 137 will be thrust forward, thereby swinging the rod 133 upward and turning the segment 129 in a counter clockwise direction (Fig. 1) about the shaft 84. This will swing the arm 124 clockwise (Fig. 1) so that the pin 125 thereon will engage the ends 144 (Fig. 2) of the slots 126 and turn all of the index indicators and their connected item wheels back to zero. As the item wheels move back to zero the setting element 85, segment 68 and rod 65 will also be adjusted to the zero position. This is due to the fact that, as previously pointed out, the block 95 attached to the item wheel 91 remains in engagement with the pin 94 on the setting element in all of the positions of the item wheels.

Before the item wheels and index indicator wheels are turned to zero, however, the shaft 84 is rocked to engage teeth 145 (Figs. 3 and 7) on the item wheels with the teeth of segments 146 (Fig. 5). For the purpose of rocking the shaft 84 a pitman 147 (Figs. 3 and 6) is loosely connected at its forward end to the plate 83 which it will be recalled is fastened to the shaft 84. At its rear end the pitman is slotted to engage the shaft 55 and a roller 148 mounted on the pitman engages a cam groove 149 in the side of a disk 150 fastened to the shaft 55. The configuration of the cam groove is such that the shaft 84 is rocked at the beginning of the operation to engage the item wheel teeth 145 with the segments 146 and the teeth are held in engagement until the latter part of the operation.

The segments 146 are secured to sleeves 152 concentric to the shaft 135. Clamped to the other ends of the sleeves are arms 155. As shown in Fig. 5 in the normal condition of the parts the item wheels 91, 92 and 93 are out of operative relationship with the segments 146. When the first key is operated and the item wheels shifted as before described, the item wheel 93 is brought opposite the left hand segment (Fig. 5) this segment being connected to the right hand or units arm 155. If a second key is operated the second shifting movement of the item wheels positions the item wheel 93 opposite the middle or tens of cents segment 146 while the item wheel 92 is brought opposite the left hand or units segment. If a third key is operated all three of the item wheels will be opposite the segments 146. When the teeth 145 on the item wheels are engaged with the segments 146 and the arm 124 operated to turn the item elements to zero, the segments 146 and arms 155 will be adjusted to positions corresponding to the amount removed from the index indicators.

The function of the arms 155 will be explained further on, it being sufficient to state at this point that after they have performed their function the segments 146 and arms 155 are all returned to normal by a pin 157 (Figs. 3 and 5) attached to an arm 158 and projecting under all of the segments. The arm 158 is fastened to the shaft 135 and this shaft is rocked by a pitman 159 (Figs. 3 and 12ᴬ) pivoted to an arm 160 attached to the shaft 135, the pitman 159 having a roller 161 engaging a cam groove 162 in a disk 163 fastened to the driving shaft 55. At the beginning of an operation the pitman is drawn rearward to swing the pin 157 down out of the road of the segments 146 and permit the segments to be adjusted by the resetting movement of the item wheels. Near the end of the operation the pitman 159 is thrust forward thereby causing the pin 157 to engage the segments 146 and return all of the segments to zero.

Only one or two of the segments 146 may be adjusted on certain operations and in order to hold stationary any segment which has not been adjusted there is provided a plate 166 (Figs. 3 and 7) fastened to the shaft 87, said plate having a laterally extending portion 167 carrying an alining blade 169 normally in position to coöperate with all three of the segments 146 when the shaft 84 is rocked. Each lateral movement of the shaft 87, however, carries the blade 169 out of operating relationship with one of the segments so that when the shaft 84 is rocked only the segment or segments with which there are no item wheels in operative relationship will be engaged by the blade when the shaft 84 is rocked.

After the segments 146 and arms 155 have been differentially adjusted by the clearing of the item elements the shaft 87 is shifted laterally to its normal position, thereby carrying the item wheels 91, 92 and 93 and the index indicators back to their original positions and reëngaging the notches 96 in the item wheels with the pin 94. This restoring movement of the shaft 87 is imparted by a cam flange 174 (Figs. 4 and 6) projecting laterally from the side of the disk 150. This cam flange is so shaped that toward the end of an operation it engages a roller 176 on an arm 177 slotted to surround the shaft 135 and attached to the shaft 87, the slot in the arm 177 being to prevent the shaft 135 from interfering with movement of the shaft 87 when the rock shaft 84 is rocked. When the cam 174 comes in engagement with the roller 176 the arm 177, shaft 87 to which it is fast, and the parts carried by the shaft are returned to their normal positions ready for the next operation of the machine.

Before the cam 174 engages the roller 176, however, the pawl 117 must be disengaged from the teeth 113 of the plate 111. For this purpose a rearwardly extending shoulder 181 (Fig. 1) of the pawl is in engagement with a stud 182 attached to a lever 183 pivoted on the shaft 135. The rearwardly extending part of the lever 183 is supported by a spring 184. Just before the cam 174 engages the roller 176 to shift the shaft 87 back to its starting point a stud 186 attached to the side of a disk 187 secured to the shaft 55 will engage the lever 183 and depress the rear end of the lever, thereby swinging the forward end of the lever up and rocking the pawl 117 about its pivot 118 far enough to withdraw its alining blade 121 from engagement with the teeth 113. The stud 186 remains in contact with the curved portion 188 of the lever 183 a sufficient length of time to permit the lateral restoring movement of the shaft 87 after which the lever 183 is released and the pawl 117 returned to normal position by its spring 122.

The index indicators 101, 102 and 103 are normally concealed from view by a screen 191 (Figs. 5, 7 and 9) but as each indicator is adjusted this screen is moved to expose the indicator to view through an opening 192 in the screen. This movement of the screen is in the same direction as the lateral movement of the index indicators when they are shifted by operation of the keys so it is apparent that in order to bring the opening 192 above the indicators the screen must have a greater extent of movement than the indicators at each operation. In the present construction at each operation of a key the screen is moved twice as far as the indicators so that if three keys are operated to adjust all three indicators at the end of the movement all three indicators will be visible through the opening 192.

The screen 191 is in the form of a thin metal plate fastened to an element 193 having a lateral movement on the sleeve 106 connecting the item wheel 93 and the index indicator 103. An arm 1931 (Fig. 9) of the element 193 is slotted to engage the rock shaft 84, thereby preventing the element 193 from turning on the sleeve 106. A laterally extending portion (Figs. 5 and 8) of the element 193 is provided with a rack 194 engaging the teeth of a segment 195. Rigid with the segment 195 is a segment 196 engaging the teeth of a rack 197 attached to an element 198 fastened to the rock shaft 84. The member on which the segments 195 and 196 are formed is pivotally attached by means of a screw 199 to a collar 200 loose on the sleeve 106 connecting the item wheel 93 and index indicator 103. In order to hold the collar 200 against lateral movement on the sleeve the right hand portion has a reduced portion 202 (Fig. 7) to receive the collar. The left portion of the sleeve has attached thereto a short collar 203 of the same diameter as the reduced portion 202 of the right hand portion of the sleeve, the collar 203 having a square shoulder 204 engaging a correspondingly shaped notch in the portion 202. Formed on the collar 203 is a flange 205 coöperating with the right hand portion of the sleeve to prevent the collar 200 from shifting along the sleeve.

The element 198 (Fig. 5) has a laterally extending portion 211 coöperating with the sides of the teeth of the segment 195 in such a way as to prevent rotative movement on the sleeve 106 of the collar 200 and the segment bearing member pivoted thereto so that the two segments 195 and 196 are at all times kept in engagement with their racks. Owing to the fact that the rack 197 is stationary and the fulcrum screw 199 for the segments 195 and 196 is moved a step at each lateral movement of the shaft 87, the member 193 and the screen 191 will be moved along the sleeve 106, this movement of the member 193 and screen being just twice as far as the movement of the index indicators.

The element 193 (Figs. 7, 8 and 9) has a laterally extending portion 213 in which is mounted a pin 214. On this pin is loosely mounted an alining yoke comprising a plate 215, which when the member 193 is shifted laterally will engage teeth 216 formed on the index indicator elements and hold the indicators and item wheels against movement. When the shaft 84 is rocked to engage the teeth on the item wheels with the segments 146 the alining plate 215 is withdrawn from engagement with the teeth 216 so that indicators and item wheels may be turned to zero. For this purpose the left hand arm 217 of the alining yoke has an extension 218 (Fig. 9) in which is formed a slot 219 (Fig. 9) engaging the shaft 71. The slot 219 is inclined at such an angle that when the shaft 84 is rocked the alining yoke will be rocked clockwise (Fig. 9) about the pin 214 thereby withdrawing the alining plate 215 from engagement with the teeth 216 on the indicators.

In addition to preventing operation of a second key after one key has been started, the right hand bar 73 also prevents operation of the driving mechanism until the operated key has been returned to its original position. For this purpose there is provided a bell crank 223 (Fig. 1) loosely mounted on the shaft 135 and having a downwardly extending arm 224, the forward edge of which is curved to coöperate with the portion 74 of the bar 73. The rearwardly extending arm of the bell crank 223 is normally held in a notch 225 in the periphery of the cam disk 187 by a spring 226. It is apparent that when the portion 74 of the bar 73 is in front of the downwardly extending arm of the bell crank 223, the cam disk 187 and shaft 53 can not rotate while on the other hand if the shaft 55 and cam disk have started to move when all keys are in normal position the bell crank will have been rocked clockwise (Fig. 1) to carry the downwardly extending arm 224 of the bell crank above the portion 74 of the bar 73 and thereby prevent operation of any of the keys.

*Differential mechanism.*

As previously intimated, the differential mechanism comprises a plurality of pairs of differentially and complementarily movable members. Each of these pairs comprises a rack bearing member 231 (Figs. 2, 3, 6 and 20) and a companion member 232. The members of each pair are close together and have slots 229 and 230 surrounding respectively the driving shaft 55 and a rock shaft 233. Extending through the slots 229 is a rod 234 supported at its ends in plates 236 (Figs. 2, 6 and 23). Both of these plates are slotted at their rear ends to engage studs 241 fastened to extensions 242 (Figs. 1 and 6) on the rear machine frame and at their forward ends the plates are slotted to engage the driving shaft 55. Mounted on the rod 234 is a pinion 243 (Figs. 2 and 25) for each pair of members, these pinions meshing with racks 246 and 247 fastened respectively to the actuating members 231 and companion members 232. Each of the plates 236 carries a roller 247 (Fig. 23) projecting into a cam slot 248 in the side of a disk 249. The disks 249 are loose on the shaft 55 and are driven by gears 250 attached to the sides of the disks and meshing with gears 251 (Figs. 2, 3 and 11) fastened to the driving shaft 57. It will be recalled that at each operation of the machine the driving shaft 57 makes two complete rotations and the cam grooves 248 are so shaped that at each rotation the plates 236 will be moved forward and then back an invariable extent. This movement of the plates 236, because of the engagement of the pinions 243 with the racks on the complementarily movable members will carry the members forward until they are arrested by steps on their forward ends engaging pins 253 projecting from the sides of the differentially adjustable arms 155. As shown in Figs. 2 and 3 the steps 255 on the members 232 are arranged in a direction opposite to that of the steps 256 on the members 231. When the arms 155 are in zero position pins 253 (Figs. 2, 3, 5 and 20) on the arms are in engagement with notches or steps 257 (Fig. 20) in arms 258 formed on the members 231. In this position the members 231 will be held stationary while the companion members 232 will, when the rod 234 and pinions 243 are drawn forward, be given ten steps of movement. It will be recalled that the "9" key rocks the segment 68 one step and this one step of movement will, of course be imparted to the arm 155 when the item mechanism is cleared. This one step of movement will position the pin 253 to engage the first step 261 (Fig. 2) on the member 232 thereby limiting the member 232 to a single step of movement while the member 231 will move forward nine steps until its lower step 262 engages the pin 253. If, on the other hand, the "1" key was operated in setting up the item when the item mechanism is cleared the arm 155 will be turned nine steps or far enough for its pin 253 to engage the top step 263 on the member 231, thereby limiting the member 231 to a single step of movement while the member 232 will move forward nine steps until its topmost step 264 strikes the pin 253. Movement of one of the members after the other has been stopped is, of course, due to the fact that during the rest of the forward movement of the rod 234 the pinion 243 will rotate about the rod and will also roll along the rack attached to whichever member is at the time being held stationary. The construction is such that when the rod 234 reaches the limit of its forward movement the elements 231 and 232 will, except in zero operations, both be held firmly in engagement with the pin 253 on the arm 155. In zero operations, it will be recalled, the elements 231 are held stationary by the arms 155 while the elements 232 are given the full ten steps of movement. When the elements 231 and 232 are returned to their rearward positions they will both be arrested positively as hereinafter explained. The construction is such that movements of the members 231 are always positively controlled. This is a valuable feature of the construction as the members 231 carry actuating racks 269 for operating the totalizers and the positive control of the members prevents any chance of wrong addition by making it impossible for the actuating members to be given a wrong extent of movement.

*Totalizing devices.*

The totalizing devices are carried in a rock frame 273 (Figs. 1, 2, 6, 7 and 12). This frame comprises two long hubs 275 loosely mounted on pins 276 inserted through holes (not shown) in the side frames of the machine. Rigid with the left hand hub 275 in an arm 277 (Figs. 2 and 6) to which is pivoted one end of a pitman 278. At its rear end the pitman 278 is slotted to engage the driving shaft 55 (Fig. 12) and is provided with a roller 281 engaging a cam slot 282 in a disk 283 fastened to the driving shaft 55. The cam slot 282 is so shaped that at each rotation of the driving shaft the totalizer frame 273 will be rocked twice, first clockwise (Figs 2 and 3) and then counter clockwise. The first of these movements of the frame 273 engages the grand totalizer with the racks 269 on members 231 and occurs after the actuating elements 231 have been differentially positioned under the control of the stops 155 so that when the elements 231 are returned to their rearward positions the racks 269 will operate the grand totalizer wheels 284. After the elements 231 and 232 have been projected forward a second time until arrested by the arms 155, the totalizer frame 273 will be rocked in the counter clockwise direction to engage the detachable totalizer with the rack teeth 269 and the rearward movement of the actuating elements 231 will then operate adding wheels 355 in the detachable totalizer. As a result of this construction the same amount will be entered in both of the totalizers.

The grand totalizer adding wheels 284 are rotatably mounted on a shaft 289 (Figs. 2, 3, 6, 13, 14 and 15) journaled in the end plates of the totalizer frame 273. Rigid with each of the three lower order adding wheels is a pinion 290 to engage the teeth 269 of the members 231. The adding wheels and pinions 290 are normally held against movement by arms 291 (Figs. 2 and 3) engaging the teeth of the pinions 290, all of these arms 291 being fast to a rock shaft 292 loosely mounted in the totalizer frame 273. The shaft 292 is rocked to disengage the arms 291 from the pinions 290 when the totalizer frame 273 is rocked to engage the pinions with the racks 269. This rocking movement of the shaft 292 is effected by an arm 293 (Figs. 1 and 6) fastened to the right hand end of the shaft. Projecting from the arm 293 is a pin 294 engaging a slot 295 in a plate 296 slidably supported on a rod 297 and the rock shaft 233. This plate is normally held stationary and the lower part of the slot therein is inclined at such an angle that when the frame 273 is rocked clockwise (Fig. 1) the shaft 292 will be rocked clockwise (Figs. 2 and 3) far enough to withdraw the arms 291 from engagement with the teeth of the pinions 290.

As will appear later, when the grand totalizer wheels are turned to zero the plate 296 will be shifted forward on its supports to withdraw the arms 291 from engagement with the totalizer pinions. The rocking movement imparted by the forward movement of the plate is slightly greater than that imparted when the totalizer frame is rocked with the plate stationary, the purpose of this greater extent of movement being not only to unlock the totalizer pinions for rotation but also to position the edges of zero stop plates 301 integral with the arms 291 in the path of pins 302 projecting from the peripheries of the grand totalizer wheels 284.

The adding wheels of the grand totalizer are turned to zero by rotations of the shaft 289, rotative movement being imparted to the shaft by means of a turn to zero lock 310 fastened to a flattened side 304 (Fig. 1) of the right hand totalizer frame hub 275. At the beginning of the rotation of the shaft 289 a spring 305 (Fig. 13) is released, thereby shifting the shaft 289 to the right and causing a disk 306 attached to the shaft to contact the higher order grand totalizer element and move all of the elements on the shaft to the right (Fig. 13) until stopped by the right hand side of the frame 273. This establishes a frictional connection between the elements and the disk 306 so that when the shaft 289 is turned the elements will be rotated.

The shaft 289 is normally held in its left hand position against the tension of the spring 305 by a tooth 307 (Figs. 6, 7 and 13) formed on a disk 308 rigid with the barrel of the turn to zero lock 310 and engaging a disk 309 fastened to the shaft 289. Rigid with the lock barrel is a bevel gear 311 meshing with a bevel gear 312 loosely mounted on the shaft 289. The hub of the bevel gear 312 has a square sided notch to engage a shoulder 313 on the hub of the disk 309. At the beginning of a turn to zero operation of the lock 310 the tooth 307 will be carried out of engagement with the disk 309 and the shaft 289 will then be shifted by the spring 305 to clutch the elements together so that they will be turned to zero as the rotation of the shaft is continued. At the end of the operation of the lock 310, the tooth 308 will engage the disk 309 and restore the parts to normal condition.

The extent of the rotation of the lock 310 is limited by a pawl 321 (Figs. 6 and 7) slidably and pivotally mounted on a stud 322 (see also Fig. 1) attached to the right hand hub 275 of the totalizer frame. The nose of the pawl is, at the end of a resetting operation, engaged by a pin 323 fastened to the disk 308 and the pawl drawn to the left against the tension of a spring 324 to the position shown. At the first operation of the machine after the totalizer has been turned to zero the rocking movement of the hub 275 will cause a downwardly projecting portion 325 of the pawl 321 to engage a stud 326 fastened to the right hand machine frame, thereby disengaging the nose of the pawl from the pin 323. As this occurs the spring 324 shifts the pawl on the stud 322 until it is stopped by contact with the side frame of the machine. Then when the totalizer frame is rocked back to normal position the pawl will be clear of the pin 323, but will be held in such position that at the next operation of the lock 310 the pin 323 will again engage the nose of the pawl 321 and move the pawl to the position in which it is shown in Figs. 6 and 7.

As previously stated, in turn to zero operations, the shaft 292 is rocked to disengage the locking arms 291 and position the zero stop plate 301 by forward movement of the plate 296. This movement is imparted to the plate 296 by a spring 331 (Figs. 1 and 6) stretched between the rock shaft 84 and the forward end of the plate. In order to hold the plate in its rearward position, a slot 332 in the plate is engaged by a pin 333 (Figs. 1, 6 and 13) attached to an upwardly extending portion of an arm 334 pivoted on a boss 335 projecting downward from the casing of the lock 310. Projecting upward from the arm 334 is a stud 337 (Fig. 6) normally engaged by a cam tooth 338 rigid with the barrel of the lock 310. At the beginning of an operation of the lock 310 the cam tooth 338 will be carried out of engagement with the stud 337 whereupon the spring 331 will draw the plate 296 forward and rock the shaft 292 to unlock the adding wheels and set the zero stops 301. A downwardly extending arm 341 (Fig. 1) on the plate 296 will also be engaged with a notch 342 in a disk 343 attached to the driving shaft 55, thereby preventing operation of the driving mechanism after the turn to zero lock 310 has been started. On the other hand, if the driving shaft has been started the notch 342 in the periphery of the disk 343 will have been carried in front of the arm 341, thereby preventing forward movement of the plate 296. When the plate is so held against forward movement the turn to zero lock 310 may be operated but the positions of the grand totalizer adding wheels will not be altered. This is due to the fact that when the plate 296 is held in its rearward position the rock shaft 292 will, of course, be held in the position where the locking arms 291 are held firmly in engagement with the pinions attached to the adding wheels, and rotation of the shaft 289 by turning the lock 310 will simply be an idle movement.

In preparing the machine to enter an item, any desired one of the detachable totalizers may be placed in position for operation. Each detachable totalizer comprises a casing 346 (Figs. 2 and 16) covering the upper part of the mechanism of the totalizer, the casing having attached thereto a handle 348 for convenience in inserting and removing the detachable totalizer from the machine. As previously pointed out in a general way, the detachable totalizer to be operated is carried in the forward part of the rock frame 273. The sides of the frame 273 are extended forward and have flanges 349 and 350 (Figs. 1 and 3) at the bottom and front respectively to hold the inserted totalizer. The right hand extension of the frame 273 is also cut out, as shown at 351, to clear a resetting knob and sleeve described later. The totalizers are latched in position by shoulders 1352 formed on spring arms 1353 attached by means of screws 1354 to the frame 273. A rod 1355 connects the upper ends of the spring arms and when it is desired to remove a detachable totalizer the operator grasps this rod and pulls the spring arms forward until the shoulders 1352 are out of the way.

Each of the detachable totalizers comprises end plates 352 (Fig. 16) and two intermediate plates 353 and 354. It also contains five adding wheels 355 loosely mounted upon a shaft 356 journaled in the right hand end plate 352 and the intermediate plate 354. Rigid with each of the adding wheels 355 is a pinion 357 which in the case of the three lower order wheels is adapted to be operated by the racks 269 on the differential elements 231.

The adding wheels are normally held against rotation by locking arms 361 (Fig. 19) fastened to a rock shaft 362 journaled in the right hand end plate 352 and the intermediate plates 353 and 354. These locking arms remain in effective position, that is, with their ends in engagement with the pinions 357 until the totalizer frame 273 is rocked to engage the pinions with the actuating racks. As the pinions move into engagement with said racks the shaft 362 is rocked to carry the arms 361 to ineffective position. The mechanism for rocking the shaft 362 comprises an arm 366 (Figs. 16 and 17) fastened to the shaft 362 and having a cam slot surrounding a pin 364 (Fig. 17) projecting from a plate 365 slidably mounted on the left hand end plate 362 of the detachable totalizer.

The plate 365 is normally held in the position shown by a spring 370 and has a laterally projecting lug 366 to coöperate with an upwardly projecting pin 367 fastened to the rear end of an arm 368 (Fig. 1) secured to the rock shaft 84. When the shaft 84 is rocked to engage the item wheels 91, 92 and 93 with the segments 146 the pin 367 will be raised through a hole 378 in a protecting plate 379 forming a part of the totalizer casing into engagement with the lug 366 of the plate 365. Then when the totalizer frame 273 is rocked forward to engage the totalizer pinions 357 with the actuating racks the pin 367 and lug 366 will coöperate to hold the plate 365 and pin 364 stationary, but the rocking movement of the totalizer frame will cause the cam slot in the arm 363 to be carried past the pin 364 until the pin reaches the portion 370 of the slot. This, of course, effects rocking movement of the shaft 362, the extent of movement being sufficient to carry the arms 361 out of engagement with the pinions 357. The position of the arms 361 at this point in the operation is represented by the dotted outline 369 (Fig. 19).

Each detachable totalizer is provided with a turn to zero knob 381 (Fig. 16) for setting the adding wheels 355 at zero. This knob is fastened to a sleeve 382 concentric to the shaft 356 and having a reduced portion 383 journaled in the right hand end plate of the detachable totalizer. In the normal condition of the parts the adding wheels 355 might be given a very limited lateral movement on the shaft 356, but as soon as the operator begins to turn the resetting knob 381 a frictional connection is established between all of the elements and the sleeve 382 so that as the knob 381 is turned all of the adding wheels will be carried to zero position where they are stopped by devices hereinafter described. In order to establish such frictional connection the shaft 356 has attached thereto a pin 384 projecting through a cam slot 385 in the sleeve 382. The first movement of the resetting knob will cause the slot 385 to draw the pin 384 and shaft 356 to the right, thereby causing a head 387 at the left end of the shaft 356 to move all of the adding elements to the right (Fig. 16) until the movement is arrested by engagement of the right hand adding wheels with the end of the sleeve 382. After the adding wheels have been turned to zero a spring 391 engaging the pin 384 and a pin 392 projecting from the sleeve 382 will move the pin 384 along the slot 385 to the position in which it is shown, thereby shifting the shaft 356 and its head 387 endwise to destroy the frictional connection between the parts on the shaft and leaving the adding elements free for rotation by their actuating racks.

It is apparent that before the adding elements can be turned to zero, as just described, the locking arms 361 must be disengaged from the pinions 357. This is effected by rocking the shaft 362 by means of a small manually operable knob 394 (Fig. 16). The knob 394 is fastened to the plate 365 previously mentioned and projects through a slot 398 in the left end plate 352. When the totalizer is to be unlocked ready to be turned to zero the knob 394 is pushed up to the top of the slot 398 and this raises the plate 365 and pin 364 until the pin is at the top portion 399 of the slot in the arm 363. As the pin 364 moves to the top of the slot the shaft 362 will be rocked past the position indicated by the dotted outline 369 and then partially returned until the arms are held in the position indicated by the dotted outline 395. In the latter position the arms will clear the nine short teeth of the pinions 357 but when the adding wheels reach the zero position the tenth or long tooth 396 on each pinion will engage the end of the corresponding arm 361 and prevent further movement of the wheel.

Between the intermediate plates 353 and 354 is mounted a step by step counter of the Veeder type. The three wheels 371 of said counter are loosely mounted on a shaft 372 journaled at its left end in the plate 353 and at its right end in the end of the shaft 356 on which the adding wheels 355 are mounted. The counter wheels 371 are operated by devices (not shown) actuated by a rocking movement imparted to the shaft 372 when the knob 394 is operated. The connections for rocking the shaft 362 comprise an arm 373 clamped to the end of the shaft and having a stud 374 engaging a slot 375 in the lower end of an arm 376 fastened to the rock shaft 362. When in adding operations the pin 364 is carried to the position 370 in the slot in the arm 363, as previously described, the rocking movement imparted to the shaft 362 is not sufficient to cause actuation on the counter wheels 371; but when the pin 364 is carried to the top 399 of the slot by operation of the knob 394, as the pin passes the point 400 in the slot the shaft 362 is rocked far enough to engage the operating devices (not shown) with the counter wheels 371 to add one on the counter when the knob 394 is returned to its original position. From the foregoing it is clear that the counter 371 will show the number of times that the detachable totalizer has been cleared and by keeping a record of this number any unauthorized clearing of the totalizer wheels can be detected.

The mechanism for effecting transfers from lower to higher orders will next be described. As previously stated, this mechanism is common to both the grand totalizer and the detachable totalizer. The units and tens of cents adding elements of the totalizers control respectively the actuating members 231 of the tens of cents and units of dollars orders to cause the actuating members to have an added step of movement when transfers are to be turned in. The transfers to the fourth and the fifth adding elements are effected directly by movement of the next lower order adding elements. The grand totalizer mechanism for controlling an actuating rack comprises a transfer tooth 402 (Figs. 13 and 14) formed on a disk 403 and a locking disk 404, a pair of these disks being rigid with each of the two lowest order adding wheels 284. Coöperating with each locking disk 404 is a locking element 406 formed on one of the side plates of a yoke 407 loose on the rock shaft 233. Attached to the locking plate 406 is a transfer plate 408 to be engaged by the long tooth 402. When the grand totalizer is rocked into engagement with the actuating racks the locking plate 404 will engage the curved portion 409 of the locking plate 406 and hold the locking plate and its yoke against displacement but when the long tooth 402 is turned far enough to enter the transfer notch 410 in the element 408, the locking plate and transfer plate will be turned clockwise (Fig. 14), this movement being permitted by a cut 413 in the locking plate 404 allowing a clearance for the point 414 of the locking plate. The left hand side plate of the yoke 407 controls the single step of relative movement of the members 231 and 232 to effect transfers. For this purpose when the locking plates 406 and transfer plates 408 have been turned by the transfer tooth 402 and locked in the new position by the periphery of the disk 404 a stud 415 projecting laterally from an extension on the element 232 will be intercepted by the left side arm of the yoke 407 one step from the normal position of the member 232 so that the actuating member 231 will be caused to move a step farther rearward than in ordinary adding operations.

The transfer yokes 407 are restored to normal at the beginning of the next operation of the complementarily movable members. In order to restore them the holes in the side arms of the yokes are provided with lugs 416 engaging longitudinal grooves 417 in the shaft 233. These grooves are wide enough to permit movement of the transfer elements on the shaft when operated by the transfer teeth 402. At the beginning of the next operation of the members 231 and 232 the shaft 233 is rocked to engage the shoulders 416 of yokes 407 which have been displaced and rocks all of the yokes back to original position and holds them there until the totalizer has been engaged with the operating racks. As the yoke is rocked back to original position a tooth 418 (Fig. 14) formed on the left hand arm of the yoke will engage a stud 419 projecting from the side of the actuating member 231, and restore the actuating member to adding relationship with the rest of the mechanism. If no transfers are to be turned in the tooth 418 will stop the member 231 at the end of its normal adding stroke.

The shaft 233 is rocked twice at each operation by a cam groove 421 (Fig. 21) in the side of a disk 422 fastened to the driving shaft 55. Coöperating with the cam groove 421 is a roller 423 attached to the side of a pitman 424 loosely connected at its forward end to an arm 425 fastened to the rock shaft 233. The configuration of the cam groove 421 is such that the shaft 423 is rocked each time that the plates 236 (Fig. 23) and the complementarily movable members 231 and 232 are moved forward.

Transfers between the totalizer elements of higher order which are not operated by actuating members 231 are, as previously stated, effected directly by movement of the lower order elements. For this purpose the units of dollars (which is the highest order wheel operated by an actuating member 231) and tens of dollars adding wheels 355 are provided with locking disks 426 and transfer disks 427 like those numbered 402, 403 and 404 previously described and these coöperate with locking elements and transfer elements similar to the elements 406 and 408 above mentioned. The left hand portions of the yokes, however are provided with studs 428 (Fig. 15) projecting into slots 429 in transfer plates 430 coöperating with the next higher order wheels. When the tooth of the transfer disk 427 associated with one of the higher order adding wheels engages the transfer notch 410 the stud 428 will engage the end of the slot 429 and rock the transfer plate 430 counter clockwise (Fig. 15) thereby causing the teeth 431 on the plate 430 to engage the teeth of the gear attached to the adding wheel of next higher order and turn the higher order wheel one division. Movement of the plates 430 is limited by a rod 432 supported by arms 439 loosely mounted on the rod 297 and shaft 233. At the beginning of the next operation the higher order yokes are all restored to their normal positions by the rocking of the shaft 233 in the same way as the yokes for lower orders. The transfer elements attached to the totalizer wheels of the detachable totalizer are the same as previously described in connection with the grand totalizer and have been given the same numerals in Figs. 2 and 16.

The actuating members 231 and 232 are normally held against movement by an alineing device comprising side arms 433 (Figs. 1, 2, 3, 20 and 24) journaled on a rod 434, the side arms being connected by a cross plate 435 beveled at its upper edge to engage with notches 436 in the lower edges of the actuating members 231. As shown there are two notches on each of these members, the rear notch being in position to coöperate with the alining plate 435 when no transfers have been turned in, the other or forward notch being in position to be engaged when the actuating member 231 has been given an additional step of movement rearward to turn in a transfer. In the normal position of the parts the plate 435 is held in engagement with the notches 436 by a cam 444 (Fig. 24) rigid with the right hand cam 249 (Fig. 6), engaging a roller 445 attached to the forward end of an arm 446 rigid with the right hand side arm 433 of the actuator alining frame. It will be recalled that the cam 249 makes two rotations at each operation of the machine, and, of course, the cam 444 does the same. At the beginning of each rotation of the cam the arm 446 will be freed, thereby allowing the arm 446 and alining frame to drop far enough to disengage the alining plate 435 from the notches 436. As the cam 249 completes its rotation the cam 444 will ride under the roller 445 and restore the arm 446 and alining plate 435 to normal effective position.

*Indicating mechanism.*

The indicators 450 (Figs. 7 and 10) for indicating the various amounts registered are rotatably mounted on a rod 451 extending laterally across the top of the machine. Fastened to each of the indicators is a pinion 452 meshing with a segment 453 loose on a rod 454. Rigid with each segment is an arm 455 (Figs. 1, 2 and 3) to which is pivoted a link 457 carrying a pin 458 engaging a slot 459 in the actuating member 231. Coöperating with the pin 458 is also a lever 461 pivoted on the shaft 55 and having a slot at its lower end engaging a roller 462 carried by an extension 463 formed on the element 232. The arrangement is such that when the members 231 and 232 are moved forward the upper end of the lever 461 will be swung rearward, the upper end of the lever and the rear end of the slot 459 coöperating to move the roller 458 and indicator setting link 457 directly from the position in which they were left by the last operation to a new position. At the end of the forward movement of the members 231 and 232 both the rear end of the slot 459 and the upper end of the lever 461 will be in engagement with the roller 458 so that the extent of the rotation of the indicator will be positively limited.

The indicators are normally held stationary by locking arms 472 (Fig. 10) attached to the shaft 454 and engaging the teeth of an alining element 473 rigid with each of the indicators. The shaft 454 is rocked to engage and disengage the alining arms 472 by a cam groove 475 (Fig. 1) in the side of the disk 187. Coöperating with this cam groove is a roller 476 projecting from the side of a pitman 477 pivoted at its upper end to an arm 478 attached to the shaft 454. The cam groove 475 is so shaped that the indicator locking arms 472 will be held out of engagement until the elements 231 and 232 have all completed their forward movement. The locking arms are then returned to engagement so as to hold the indicators in the positions to which they have just been adjusted.

*Operation.*

In order to summarize the operation a brief statement will be given as to just what occurs when entering a 5¢ item, a $2.00 item and a 23¢ item.

In entering the 5¢ item the "5" key is depressed the full distance and then released. As the key is depressed its slot 64 will coöperate with the rod 65 to impart five steps of movement to the segment 68. This movement is transmitted through the pinion 81 to the setting element 85, rotating said element five steps and causing the pin 94 attached to the element to turn the three item wheels 91, 92 and 93 a like extent. As the key is being depressed and the item wheels turned the beveled edge 116 of the element 115 engages the bevel of the right hand tooth 114 (Fig. 5) of the plate 111 and shifts all three of the item wheels slightly to the right. When the key returns to its normal position the pawl 117 engages the bevel portion of the first tooth 113 of the plate 111, thereby shifting the item wheels a further extent to the right. As a result of these two shifting movements the item wheel 93 will be entirely disengaged from the setting pin 94 and positioned opposite the left hand segment 146. The operating handle 51 is then turned. At the beginning of the operation of the handle the pitman 147 (Fig. 3) is drawn rearward, thereby rocking the frame 83 to engage the item wheel 93 with the units segment 146. The item wheels are then all returned to zero by movement of the rod 125 and this results in the left hand or units segment 146 and the right hand differential stop arm 155 connected thereto being given five steps of movement so that the pin 253 on said arm will be set at the right position to limit the units actuator 231 to five steps of movement.

In entering the $2.00 item the "2" key is operated first and the "0" key is then operated twice. Operation of the "2" key sets the item wheels 91, 92 and 93 at the two position, disengages item wheel 93 from the pin 94 and positions said wheel opposite the left hand segment 146. The first operation of the "0" key will turn the setting element 85 and item wheels 91 and 92 back to zero and at the same time will shift the item wheels to bring the item wheel 93 opposite the middle segment 146 and the item wheel 92 opposite the left hand segment 146. The second operation of the "0" key will not result in turning the item wheels but will simply shift all three wheels to the right (Fig. 5) so that at the end of the second operation of the "0" key the item wheel on which the 2 has been set up will be opposite the right hand or dollar segment 146 while the item wheels 91 and 92 will be opposite respectively the units and tens of cents segments 146. Then when the arm 124 and rod 125 are operated the item wheel 93 will be given two steps of movement to set the dollar segment 146 and stop arm 155 while the other two segments 146 will remain stationary at their zero positions. Then when the actuators 231 are operated the dollar actuator will be limited to two steps of movement, and the units and tens of cents actuators held at zero.

In entering the 23¢ item the "2" key is pressed first, thereby setting up two on the item wheel 93 and positioning said wheel opposite the left hand segment 146. The "3" key is then pressed, thereby adjusting the item wheels 91 and 92 to the three position and shifting the item wheels so that the item wheel 93 will be opposite the middle or tens of cents actuator 146 and the item wheel 92 opposite the left hand or units of cents segment 146. Then when the operating handle is operated and the item wheels cleared the units and the tens of cents segments 146 and arms 155 will be set properly to limit the tens of cents and units of cents actuators 231 to add the correct amount.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the ten key class, the combination with a key for each of the ten digits, of a plurality of pairs of members having differential relative movements, and means whereby the keys control said movements.

2. In a machine of the class described, the combination with a plurality of pairs of members constructed to be given differential relative movements, of means for actuating the members, and ten keys, one for each of the digits, common to and controlling the relative movements of all of the pairs of members.

3. In a machine of the ten key class, the combination with a key for each digit, of a plurality of pairs of movable members, and means controlled by the keys for giving said members differential relative movements combining to a constant value.

4. In a machine of the ten key class, the combination with a keyboard containing a key for each digit, of a plurality of sets of complementarily and differentially movable members, and means controlled by the digit keys for moving said members.

5. In a machine of the class described, the combination with a plurality of pairs of members having differential relative movements, of means for operating the members, a plurality of differentially adjustable stops for controlling the relative movements of the pairs of members, and a key for each of the ten digits controlling all of the stops.

6. In a machine of the class described, the combination with a plurality of pairs of members having differential relative movements, of means for operating the members, a plurality of differentially adjustable stops controlling the relative movements of the pairs of members, ten keys, one for each digit, operable to determine the subsequent adjustment of the stops, and means for adjusting the stops.

7. In a machine of the ten key class, the combination with a key for each of the ten digits, of a plurality of pairs of differentially and complementarily movable members, a differentially adjustable stop for each pair of members, and means controlled by each key for adjusting the stops.

8. In a machine of the ten key class, the combination with a key for each of the ten digits, of a plurality of pairs of differentially and complementarily movable members, a differentially adjustable stop for each pair of members, and means controlled by the keys for adjusting the stops to positions representing each key operated.

9. In a machine of the ten key class, the combination with a key for each of the digits, of a plurality of pairs of differentially and complementarily movable members, a differentially adjustable stop for each pair of members, means whereby operation of any key determines the subsequent adjustment of the stops, and means for adjusting the stops.

10. In a machine of the ten key class, the combination with an accounting device, of item entering mechanism therefor comprising a plurality of pairs of differentially and complementarily movable members, and ten digit keys any of which controls said members to enter amounts of several denominations in the accounting device.

11. In a machine of the ten key class, the combination with an accounting device, of item entering mechanism therefor comprising a plurality of pairs of members having differential relative movements, means for actuating the members, and ten keys, one for each of the digits, any key controlling said members to enter amounts in the accounting device.

12. In a machine of the ten key class, the combination with a totalizer, of item entering mechanism therefor comprising a plurality of pairs of differentially movable members, and ten digit keys any of which control said members to enter amounts on the totalizer.

13. In a machine of the ten key class, the combination with a totalizer, of item mechanism therefor comprising a plurality of pairs of differentially movable members, a key for each of the ten digits, and means controlled by any of the keys for differentially operating the pairs of members.

14. In a machine of the ten key class, the combination with a totalizer, of item mechanism therefor comprising a plurality of pairs of members having differential relative movements combining to a constant value, and ten keys, one for each of the digits, any one of which controls the movements of the pairs of members.

15. In a machine of the class described, the combination with a totalizer, of totalizer actuating devices comprising a plurality of pairs of differentially and relatively movable members, means for imparting to the pairs of members differential relative movements combining to a constant value, ten keys, one for each of the digits, and means controlled by the keys for controlling the relative movements of the members in the differential pairs.

16. In a machine of the class described, the combination with a totalizer, of totalizer actuating devices comprising a plurality of pairs of differentially and relatively movable members, one member of each pair being constructed to actuate the totalizer, means for imparting to the pairs of members differential relative movements combining to a constant value, ten keys common to all of the pairs of members, and means controlled by said keys and in turn controlling the differential relative movements of all of the pairs of members.

17. In a machine of the class described, the combination with a totalizer, of a plurality of pairs of differentially and relatively movable members, one member of each pair carrying a totalizer actuating rack, ten keys, one for each of the digits, differentially adjustable stops controlling the differential relative movements of the members, and means actuated by the keys for controlling the adjustment of the stops.

18. In a machine of the ten key class, the combination with a totalizer, of item mechanism therefor comprising a plurality of pairs of members having differential relative movements, one member of each pair carrying a totalizer operating rack, means for actuating the pairs of members, and ten keys, one for each of the digits, any one of which controls the relative movements of the pairs of members.

19. In a machine of the class described, the combination with a totalizer, of item entering mechanism therefor comprising a plurality of pairs of members having differential relative movements, one member of each pair carrying a totalizer operating rack, ten keys, one for each of the digits, a plurality of differentially adjustable stops controlling the differential relative movements of the members, and means controlled by the keys for differentially adjusting the stops.

20. In a ten key machine, a totalizer, actuators therefor, stops adjustable to control the actuators, numeral elements adjustable by means of the keys to set up the items to be entered on the totalizer, means for imparting a zeroizing movement to the numeral elements, and connections for transmitting the zeroizing movement of the numeral elements to the aforesaid stops whereby to adjust the stops according to the item to be entered.

21. In a ten key machine, a totalizer, totalizer actuators, stops differentially adjustable to control the movement of the actuators, numeral elements operable by means of the keys to set up the items to be entered on the totalizer, means for setting the numeral elements to zero, and connections for transmitting the zeroizing movement of the numeral elements to the aforesaid stops whereby to set the stops according to the item to be entered.

22. In a ten key machine, a totalizer, totalizer actuators, differentially adjustable stops controlling the adjustment of the actuators, digit carriers adjustable by means of the keys to set up the items to be entered on the totalizer, means for clearing said digit carriers, and conections for transmitting the clearing movement of the digit carriers to the aforesaid stops to adjust the stops to represent the item to be entered.

23. In a ten key machine, a totalizer, a set of actuators therefor, stops operable to limit differentially the movements of the actuators, indicators operable by means of the keys to set up the items to be entered on the totalizer, a screen normally concealing the indicators but operable to expose only the indicators which have been adjusted, means for clearing the indicators and restoring the screen to normal position, and means for transmitting the clearing movement of the indicators to the aforesaid stops whereby to predetermine the movements of the actuators.

In testimony whereof I affix my signature.

THOMAS CARROLL.

It is hereby certified that in Letters Patent No. 1,302,509, granted May 6, 1919, upon the application of Thomas Carroll, of Dayton, Ohio, for an improvement in "Cash-Registers," errors appear in the printed specification requiring correction as follows: Page 2, line 8, strike out the word "to"; page 7, line 54, for the reference-numeral "247" read *2471;* page 9, line 122, for the reference-numeral "366" read *363;* page 13, line 102, claim 8, for the words "the keys" read *each key;* same page and claim, line 103, for the words "each key" read *the keys;* and that the said Letters Patent should be read with these corrections therein that the same may conform to the record of the case in the Patent Office.

Signed and sealed this 17th day of June, A. D., 1919.

[SEAL.]

J. T. NEWTON,
*Commissioner of Patents*

Cl. 235—9.